Figure 1:
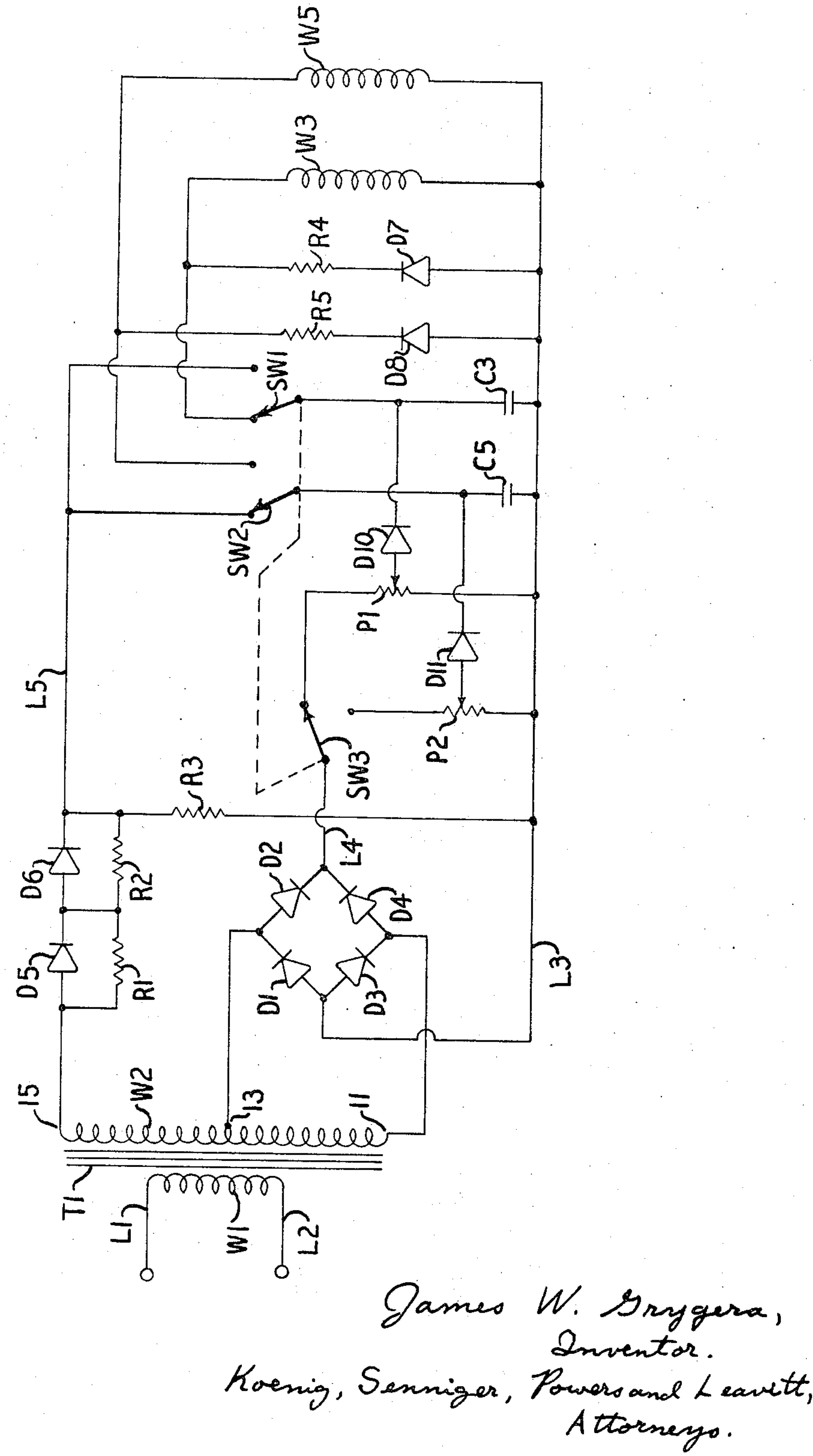

CONTROL APPARATUS FOR ELECTRICALLY OPERATED CLUTCH AND BRAKE

Filed Aug. 12, 1966 2 Sheets-Sheet 1

FIG. I.

James W. Grygera,
Inventor.
Koenig, Senniger, Powers and Leavitt,
Attorneys.

United States Patent Office 3,379,292

Patented Apr. 23, 1968

3,379,292

CONTROL APPARATUS FOR ELECTRICALLY OPERATED CLUTCH AND BRAKE

James W. Grygera, Racine, Wis., assignor to Eaton Yale & Towne, Inc., Cleveland, Ohio, a corporation of Ohio Filed Aug. 12, 1966, Ser. No. 572,013

8 Claims. (Cl. 192—12)

This invention relates to control apparatus for an electrically operated clutch and brake system and more particularly to such apparatus which provides particularly rapid response of the clutch and brake when alternately energized.

Among the several objects of the present invention may be noted the provision of control apparatus providing exceptionally rapid response in an electrically operated clutch and brake which are alternately energized by the control apparatus; the provision of such control apparatus wherein the brake and the clutch are each initially energized at a relatively high voltage and are then maintained energized at a relatively low voltage; the provision of such apparatus employing separate high and low voltage sources; the provision of such apparatus in which the high voltage source is not loaded by the low voltage source; the provision of such apparatus which is highly reliable; and the provision of such apparatus which is relatively simple and inexpensive. Other objects and features will be in part apparent and in part pointed out hereinafter.

Briefly, control apparatus of this invention provides rapid responses in an electrically operated clutch and an electrically operated brake having respective D.C. excited windings which are alternately energized. The control apparatus includes a first electrical power source providing current at a first, relatively high voltage and a second electrical power source providing current at a second, relatively low voltage. First and second energy storage capacitors are provided, associated with the brake and clutch respectively. A first switching means connects the first capacitor alternately to the first source to be charged thereby and to the brake winding. A second switching means connects the second capacitor alternately to the first source and to the clutch winding. The first and second switching means are coupled for simultaneous operation whereby when one of the capacitors is connected to the first source the other capacitor is connected to the respective winding. First and second rectifier means connect the first and second capacitors respectively to the second source and thus isolate the first source from the second source during charging of the respective capacitor by the first source. Accordingly, the clutch and brake, when energized, are initially excited at a voltage higher than the second voltage by energy stored in the respective capacitors and are then maintained energized by current from the second source thereby providing rapid response to operation of the switching means.

The invention accordingly comprises the constructions hereinafter described, the scope of the invention being indicated in the following claims.

Figure 2:
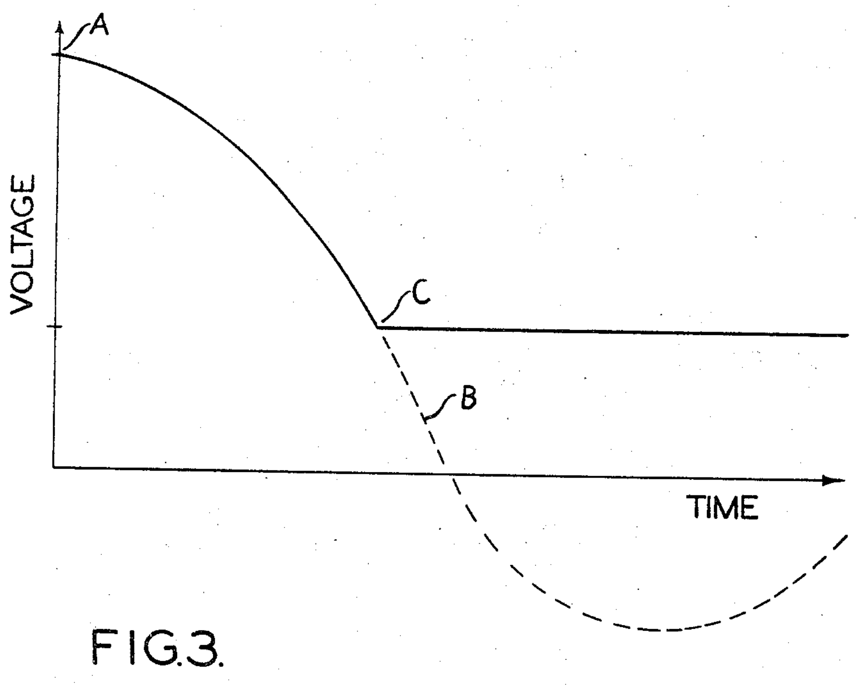
Figure 3:
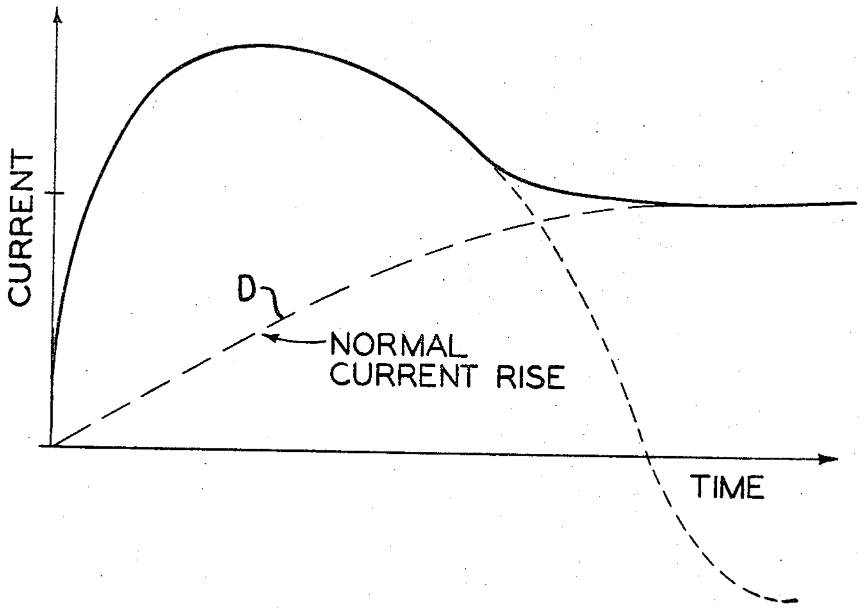

In the accompanying drawings, in which one of various possible embodiments of the invention is illustrated, FIG. 1 is a schematic circuit diagram of control apparatus of the present invention for alternately energizing a clutch and a brake;

FIG. 2 is a graph representing the behavior with time of the voltage applied to a brake winding by the control apparatus of FIG. 1; and FIG. 3 is a graph similarly representing the current drawn by the brake winding over the same time interval.

Corresponding reference characters indicate corresponding parts throughout the drawings.

Referring now to FIG. 1, there is indicated at T1 a power transformer for providing a plurality of voltages. Transformer T1 includes a primary winding W1 which may be connected, through a pair of leads L1 and L2, to a suitable A.C. source or supply means (not shown). Transformer T1 also includes a secondary winding W2 having output taps as indicated at 11, 13 and 15. Taps 13 and 15 provide A.C. voltages at a relatively low potential and a relatively high potential, respectively, with respect to tap 11. A full-wave bridge rectifier constituted by diodes D1–D4 is connected across taps 11 and 13 and provides a source of relatively low voltage pulsating D.C. across a pair of supply leads L3 and L4. Transformer tap 15 is connected to a supply lead L5 through a pair of diodes D5 and D6 to provide at line L5 a source of D.C. at a relatively high voltage with respect to line L4. Diodes D5 and D6 are connected in series to provide a relatively high peak inverse voltage rating and the inverse voltage is divided equally between them by a pair of respective shunting resistors R1 and R2 which accommodate any difference in their leakage currents. Line L5 is connected to line L3 through a bleeder resistor R3.

At W3 is indicated the actuating winding of an electromagnetically operated brake and at W5 there is similarly indicated the actuating winding of an electromagnetically operated clutch. As is understood by those skilled in the art, such a clutch and brake may be combined in a single coupling unit for selectively coupling mechanical energy from a motive source, such as an electric motor allowed to run continuously, to a load which is to be operated intermittently, e.g., a sewing machine.

Winding W3 is shunted by a network comprising a diode D7 and a resistor R4 and winding W5 is similarly shunted by a network comprising a diode D8 and a resistor R5. These networks dissipate the energy inductively stored in the respective winding when that winding is deenergized.

Associated with each of the windings W3 and W5 is a respective energy storage capacitor C3 and C5. One end of each of the capacitors is connected to line L3. By means of a set of switch contacts SW1, the other end of capacitor C3 may be connected either to the high voltage D.C. supply line L5 or to the respective winding W3. Similarly, by means of a set of switch contacts SW2, the other end of capacitor C5 may be connected either to the line L5 or to the respective winding W5. Switch contacts SW1 and SW2 are mechanically coupled for simultaneous operation and are interconnected so that when one of the capacitors is connected to supply line L5 the other capacitor is connected to its respective winding.

Coupled to and operated simultaneously with the contacts SW1 and SW2 is a third set of switch contacts SW3 which selectively connect the low voltage supply line L4 alternately to one end of a first power potentiometer P1 or to one end of a second power potentiometer P2. Switch contacts SW1, SW2 and SW3 may, for example, be constituted by contacts of a relay, the operation of which is to control the alternate energization of the clutch and brake. The other end of each of potentiometers P1 and P2 is connected to the common D.C. supply lead L3. Capacitor C3 is connected to the movable contact of potentiometer P1 through a rectifying diode D10 and capacitor C5 is connected to the movable contact of potentiometer P2 through a rectifying diode D11. The diodes D10 and D11 are oriented to permit current to flow from the potentiometer to the respective capacitor but not in the reverse direction.

In operation, windings W3 and W5 are energized by power taken from the supply leads L4 and L5 substantially as follows. When the operation of either the clutch or the brake is sustained over an appreciable period of time, the respective winding W3 or W5 is energized from the low voltage supply line L4 through the respective power potentiometer and blocking diode. The level of energization may be adjusted by means of the respective potentiometer to an appropriate level for such continuous energization. While one of the windings is thus energized from the low voltage supply line L4, the energy storage capacitor C3 or C5 respectively associated with the other of the windings is charged to a relatively high voltage from supply line L5. It should be noted that the high voltage source is not loaded by the low voltage source or the respective power potentiometer associated with the capacitor then being charged since the flow of current from the high voltage supply line L5 toward the respective potentiometer is blocked by the respective diode D10 or D11. Thus, the capacitor associated with the denergized winding is fully charged to the relatively high voltage supplied by line L5.

Upon operation of the ganged switches SW1–SW3, the previously energized winding is deenergized and the energy storage capacitor associated with the previously deenergized winding is discharged into that winding. The discharge of capacitively stored energy provides a surge of current into the winding at a relatively high voltage producing a very rapid energization of the winding and a correspondingly rapid operation of the clutch or brake operated by that winding.

From FIG. 2, which represents the behavior of the voltage initially applied to the brake windings W3, it may be seen that the voltage starts out as indicated at A at the relatively high level provided at the line L5. As capacitor C3 discharges into the inductive winding, the voltage behaves essentially as a damped sinusoid (B) until the voltage falls to the level, as indicated at C, selected by the adjustment of the power potentiometer P1. At this point, the respective blocking diode D10 becomes forward biased and current from line L4 flows to maintain the winding voltage at this level. The capacitor C3 then acts as a ripple filter.

In FIG. 3, which represents the corresponding behavior of the current flowing through winding W3 over the same interval as illustrated in FIG. 2, it can be seen that the initial application of a relatively high voltage causes the winding current to rise quite rapidly. The winding current overshoots momentarily the steady state current level of the winding and then drops essentially to the preselected steady state level as the voltage settles to the level preselected by the adjustment of the power potentiometer P1. The voltage and current behavior of the clutch winding upon initial energization is essentially similar, the steady state values being preselected by adjustment of the power potentiometer P2. As the response of the clutch or brake associated with the winding varies essentially as a function of the current flow in the coil, it can be seen that a considerable improvement in rapidity of response is obtained as contrasted with normal or constant voltage excitation of the windings. For contrast, the build-up of current in winding W3 under excitation at a constant voltage equal to that which ultimately produces the rated current flow is indicated at D in FIG. 3.

It should be noted that the degree to which response is accelerated or "forced" is relatively precisely controlled since separate voltage sources are provided which determine the initial and continuous energization voltage levels and further that switching between the sources in response to energization of either of the windings is obtained smoothly and essentially automatically by the operation of the blocking or gating diodes D10 and D11.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Control apparatus for alternately energizing an electrically operated clutch and an electrically operated brake having respective D.C. excited windings and for providing rapid responses therein, said apparatus comprising:
- a first electrical power source providing current at a first relatively high voltage;
- a second electrical power source providing current at a second relatively low voltage;
- a first energy storage capacitor;
- a second energy storage capacitor;
- first switching means for connecting said first capacitor alternately to said first source to be charged thereby and to said brake winding;
- second switching means for connecting said second capacitor alternately to said first source to be charged thereby and to said clutch winding, said first and second switching means being coupled for simultaneous operation whereby when one of said capacitors is connected to said first source the other is connected to the respective winding;
- first rectifier means connecting said first capacitor to said second source for isolating said first source from said second source during charging of said first capacitor by said first source; and
- second rectifier means connecting said second capacitor to said second source for isolating said first source from said second source during charging of said second capacitor by said first source whereby said brake and said clutch when energized are initially excited at a voltage higher than said second voltage by energy stored in the respective capacitors and are then maintained energized by current from said second source thereby providing a rapid response of said clutch and brake to operation of said switching means.

2. Control apparatus as set forth in claim 1 wherein said first and second sources comprise different taps on a single transformer winding.

3. Control apparatus as set forth in claim 2 wherein said second source comprises a full-wave bridge rectifier having input terminals connected to said secondary winding.

4. Control apparatus as set forth in claim 1 wherein said second source includes respective means for independently adjusting the voltage supplied to each of said first and second capacitors through the respective rectifier means.

5. Control apparatus as set forth in claim 4 wherein each of said adjusting means comprises a potentiometer.

6. Control apparatus as set forth in claim 5 including third switch means for connecting said second source across said potentiometers alternately, said third switch means being coupled to said first and second switch means for simultaneous operation therewith.

7. Control apparatus as set forth in claim 1 including means for dissipating the inductively stored energy released upon deenergization of each of said windings.

8. Control apparatus for alternately energizing an electrically operated clutch and an electrically operated brake having respective D.C. excited windings and for providing rapid responses therein, said apparatus comprising:
- a transformer including a secondary winding having taps providing a relatively high A.C. voltage and a relatively low A.C. voltage;
- first and second rectifying means connected to said secondary winding for providing relatively high and relatively low D.C. voltages from said high and low A.C. voltage respectively;
- a first energy storage capacitor;
- a second energy storage capacitor;
- first switching means for connecting said first capacitor alternately to said first rectifying means to be charged therefrom and to said brake winding;

second switching means for connecting said second capacitor alternately to said first rectifying means to be charged therefrom and to said clutch winding, said first and second switching means coupled for simultaneous operation whereby when one of said capacitors is connected to said first rectifying means the other is connected to the respective winding;

first and second resistance means for adjustably reducing said relatively low D.C. voltage for application to said brake and clutch respectively;

third switch means for applying said relatively low D.C. voltage to said first and second resistance means alternately, said third switch means being coupled to said first and second switch means for operation simultaneously therewith;

first diode means connecting said first capacitor to said first resistance means for isolating said high D.C. voltage from said first resistance means during charging of said first capacitor from said first rectifying means; and second diode means connecting said second capacitor to said second resistance means for isolating said high D.C. voltage from said second resistance means during charging of said second capacitor from said first rectifying means whereby said brake and said clutch when energized are initially excited at a voltage higher than said relatively low D.C. voltage by energy stored in the respective capacitors and are then maintained energized by current from said second rectifying means thereby providing a rapid response of said clutch and brake to operation of said switching means.

References Cited

UNITED STATES PATENTS

| | | | | |
|---|---|---|---|---|
| 2,600,667 | 6/1952 | Mason | 192—18.2 | XR |
| 2,692,353 | 10/1954 | Mason et al. | 192—14 | XR |
| 2,728,878 | 12/1955 | Sperr | 192—18.2 | XR |
| 2,946,418 | 7/1960 | Leeson | 192—18.2 | XR |
| 2,979,175 | 4/1961 | Schalk | 192—12.2 | |
| 3,019,870 | 2/1962 | Even-Tov | 192—18.2 | |
| 3,154,727 | 10/1964 | Hulls | 192—18.2 | XR |

CARLTON R. CROYLE, *Primary Examiner.*

C. LEEDOM, *Assistant Examiner.*